(12) United States Patent
Iwaki et al.

(10) Patent No.: US 10,222,911 B2
(45) Date of Patent: Mar. 5, 2019

(54) SEMICONDUCTOR DEVICE AND DRIVING METHOD OF THE SAME

(71) Applicant: SEMICONDUCTOR ENERGY LABORATORY CO., LTD., Atsugi-shi, Kanagawa-ken (JP)

(72) Inventors: Yuji Iwaki, Kanagawa (JP); Katsuki Yanagawa, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 103 days.

(21) Appl. No.: 14/243,000

(22) Filed: Apr. 2, 2014

(65) Prior Publication Data
US 2014/0306935 A1  Oct. 16, 2014

(30) Foreign Application Priority Data

Apr. 12, 2013  (JP) ................................. 2013-083466

(51) Int. Cl.
*G06F 3/043*  (2006.01)
*G06F 3/041*  (2006.01)
*G09G 3/36*  (2006.01)

(52) U.S. Cl.
CPC ............ *G06F 3/043* (2013.01); *G06F 3/0416* (2013.01); *G09G 3/3648* (2013.01); *G09G 2320/0626* (2013.01); *G09G 2320/0666* (2013.01); *G09G 2354/00* (2013.01); *G09G 2360/148* (2013.01)

(58) Field of Classification Search
None
See application file for complete search history.

(56) References Cited

U.S. PATENT DOCUMENTS

| 6,011,580 | A | 1/2000 | Hattori et al. |
| 6,747,638 | B2 | 6/2004 | Yamazaki et al. |
| 7,597,177 | B2 | 10/2009 | Oh et al. |
| 8,169,404 | B1 * | 5/2012 | Boillot .................... G06F 3/011 345/156 |
| 8,743,091 | B2 * | 6/2014 | Bernstein .............. G06F 3/0436 345/177 |

(Continued)

FOREIGN PATENT DOCUMENTS

| JP | 2001-292276 | 10/2001 |
| JP | 2006-235859 A | 9/2006 |

(Continued)

OTHER PUBLICATIONS

Oikawa. M et al., "Sample Applications Suitable for Features of Integral Videography", 2008, SID Digest '08 : SID International Symposium Digest of Technical Papers, vol. 39, pp. 748-751.

*Primary Examiner* — Antonio Xavier
(74) *Attorney, Agent, or Firm* — Nixon Peabody LLP; Jeffrey L. Costellia

(57) ABSTRACT

To provide a semiconductor device to which information can be input in low-illuminance conditions or at a location distant from the semiconductor device. An ultrasonic wave sensor is provided in the semiconductor device with a display region having photosensors. An object to be detected is detected by switching the photosensors and the ultrasonic wave sensor in accordance with illuminance around the semiconductor device or a distance between the semiconductor device and the object. The photosensors and the ultrasonic wave sensor can be used concurrently.

7 Claims, 7 Drawing Sheets

(56) References Cited

U.S. PATENT DOCUMENTS

| | | | | |
|---|---|---|---|---|
| 2002/0196238 A1* | 12/2002 | Tsukada | ................ | G06F 3/0421 |
| | | | | 345/173 |
| 2004/0160429 A1* | 8/2004 | Blake | ...................... | G06F 3/043 |
| | | | | 345/179 |
| 2004/0164970 A1* | 8/2004 | Benard | ................. | G06F 3/0436 |
| | | | | 345/177 |
| 2008/0018612 A1* | 1/2008 | Nakamura | .............. | G06F 3/044 |
| | | | | 345/173 |
| 2008/0231605 A1* | 9/2008 | Yang | ..................... | G06F 3/0416 |
| | | | | 345/173 |
| 2009/0033850 A1* | 2/2009 | Ishiguro | .............. | G02F 1/13338 |
| | | | | 349/116 |
| 2009/0058829 A1* | 3/2009 | Kim | ...................... | G06F 3/0416 |
| | | | | 345/173 |
| 2009/0122024 A1* | 5/2009 | Nakamura | ........... | G06F 3/0416 |
| | | | | 345/173 |
| 2009/0207131 A1 | 8/2009 | Togami et al. | | |
| 2009/0305742 A1* | 12/2009 | Caballero | ............ | H04B 1/3838 |
| | | | | 455/566 |
| 2010/0060592 A1* | 3/2010 | Bernstein | ............ | G06F 3/0412 |
| | | | | 345/173 |
| 2010/0182282 A1* | 7/2010 | Kurokawa | .......... | G02F 1/13338 |
| | | | | 345/175 |
| 2010/0279738 A1* | 11/2010 | Kim | ........................ | G06F 3/016 |
| | | | | 455/566 |
| 2011/0069038 A1* | 3/2011 | Fann | .................... | G02F 1/13338 |
| | | | | 345/175 |
| 2011/0109591 A1 | 5/2011 | Kurokawa et al. | | |
| 2011/0148820 A1* | 6/2011 | Song | ..................... | G06F 3/0428 |
| | | | | 345/175 |
| 2011/0157094 A1* | 6/2011 | Boer | ..................... | G06F 3/0412 |
| | | | | 345/175 |
| 2011/0221945 A1* | 9/2011 | Kurokawa | ........... | G06F 3/0412 |
| | | | | 348/300 |
| 2011/0242055 A1* | 10/2011 | Kim | ........................ | G06F 3/042 |
| | | | | 345/175 |
| 2011/0248941 A1* | 10/2011 | Abdo | .................... | G06F 3/0488 |
| | | | | 345/173 |
| 2012/0001868 A1* | 1/2012 | Na | .......................... | G06F 3/041 |
| | | | | 345/174 |
| 2012/0105331 A1* | 5/2012 | Nomoto | .................. | G06F 3/041 |
| | | | | 345/169 |
| 2012/0113018 A1* | 5/2012 | Yan | ...................... | G06F 3/04883 |
| | | | | 345/173 |
| 2012/0229431 A1 | 9/2012 | Hiroki | | |
| 2012/0242636 A1* | 9/2012 | Yuki | ..................... | G06F 3/0412 |
| | | | | 345/207 |
| 2012/0268422 A1* | 10/2012 | Hirakawa | ............. | G06F 1/3203 |
| | | | | 345/174 |
| 2012/0313913 A1* | 12/2012 | Shiraki | ................. | G06F 3/0412 |
| | | | | 345/207 |
| 2013/0009909 A1 | 1/2013 | Yamazaki et al. | | |
| 2013/0021239 A1 | 1/2013 | Koyama et al. | | |
| 2013/0062522 A1* | 3/2013 | Jiang | ................ | H01L 27/14609 |
| | | | | 250/338.4 |
| 2013/0176266 A1* | 7/2013 | Kao | ...................... | G06F 3/0416 |
| | | | | 345/174 |
| 2013/0222294 A1* | 8/2013 | Choi | ...................... | G06F 3/041 |
| | | | | 345/173 |
| 2013/0293490 A1* | 11/2013 | Ward | .................... | G06F 3/0488 |
| | | | | 345/173 |
| 2013/0307775 A1* | 11/2013 | Raynor | ................... | G06F 3/017 |
| | | | | 345/158 |
| 2013/0342501 A1* | 12/2013 | Molne | .................. | G06F 3/0416 |
| | | | | 345/174 |

FOREIGN PATENT DOCUMENTS

| | | |
|---|---|---|
| JP | 2007-065800 A | 3/2007 |
| JP | 2007-525669 | 9/2007 |
| JP | 2009-199158 A | 9/2009 |
| JP | 2011-022853 A | 2/2011 |
| JP | 2013-037678 A | 2/2013 |
| WO | WO-2005/093708 | 10/2005 |

* cited by examiner

SEMICONDUCTOR DEVICE AND DRIVING METHOD OF THE SAME

BACKGROUND OF THE INVENTION

1. Field of the Invention

One embodiment of the present invention relates to a semiconductor device and a driving method thereof.

In this specification, a semiconductor device refers to any device which can function by utilizing semiconductor characteristics; an electro-optical device, a light-emitting display device, a semiconductor circuit, and an electronic device are all included in semiconductor devices.

2. Description of the Related Art

In recent years, attention has been driven to semiconductor devices provided with light-detecting sensor elements (also referred to as photosensors). Examples of a semiconductor device provided with a photosensor are a CCD image sensor and a CMOS image sensor. They are used in, for example, electronic devices having an imaging function like digital still cameras or cellular phones.

A semiconductor device having a photosensor in a display portion, which can detect a touch of an object to be detected (e.g., a pen and a finger) on the display portion, is also called a touch panel, a touch screen, or the like (hereinafter simply called a "touch panel"). Such a photosensor provided in the display portion enables the display portion to double as an input region; as an example, a semiconductor device having an image loading function has been disclosed in Patent Document 1.

PATENT DOCUMENT

Patent Document 1: Japanese Published Patent Application No. 2001-292276

SUMMARY OF THE INVENTION

However, the semiconductor device in which the display portion with photosensors also serves as an input region has a problem of difficulty in inputting information in low-illuminance conditions (e.g., in the night-time or indoors).

A method in which information corresponding to the movement of a user which is captured by a camera is input to a semiconductor device is also known; however, there is a problem of difficulty in inputting information in low-illuminance conditions (e.g., in the night-time or indoors).

It is an object to provide a semiconductor device in which information can be input in low-illuminance conditions.

It is an object to provide a semiconductor device in which information can be input at a location distant from an input region.

One embodiment of the present invention is a semiconductor device which includes a plurality of photosensors, an ultrasonic wave transmitter, and an ultrasonic wave receiver. The plurality of photosensors are provided in a display portion. The ultrasonic wave receiver detects a reflected wave of ultrasonic waves output from the ultrasonic wave transmitter. Note that the photosensors, the ultrasonic wave transmitter, and the ultrasonic wave receiver can be concurrently used.

When information is input to the semiconductor device in low-illuminance conditions or at a location greatly distant from an input region, the information is input with the ultrasonic wave transmitter and the ultrasonic wave receiver.

One embodiment of the present invention is a semiconductor device which includes a display portion comprising a plurality of pixels and a plurality of photosensors, a first ultrasonic wave transmitter, a second ultrasonic wave transmitter, a first ultrasonic wave receiver, and a second ultrasonic wave receiver. The plurality of photosensors are provided in the display portion. The first ultrasonic wave receiver detects a reflected wave of a first ultrasonic wave output from the first ultrasonic wave transmitter. The second ultrasonic wave receiver detects a reflected wave of a second ultrasonic wave output from the second ultrasonic wave transmitter.

A frequency of the first ultrasonic wave is preferably different from a frequency of the second ultrasonic wave.

The first ultrasonic wave receiver includes a plurality of ultrasonic wave sensors arranged in a first direction. The second ultrasonic wave receiver includes a plurality of ultrasonic wave sensors arranged in a second direction. The first direction intersects with the second direction at right angles.

One embodiment of the present invention is a method for driving a semiconductor device comprising a display portion having a photosensor and an ultrasonic wave sensor. A location of an object is identified with any one of the photosensor and the ultrasonic wave sensor, selected depending on illuminance measured with the photosensor.

For example, a location of an object is identified with the photosensor in the case where the illuminance is higher than or equal to a reference illuminance and a location of an object is identified with the ultrasonic wave sensor in the case where the illuminance is lower than a reference illuminance.

One embodiment of the present invention is a method for driving a semiconductor device comprising a display portion having a photosensor and an ultrasonic wave sensor. A location of an object is identified with any one of the photosensor and the ultrasonic wave sensor, selected depending on a distance from the display portion to the object. The distance from the display portion to the object is measured by the ultrasonic wave sensor.

For example a location of an object is identified with the photosensor in the case where the distance is shorter than a reference distance and a location of an object is identified with the ultrasonic wave sensor in the case where the distance is longer than or equal to a reference distance.

A semiconductor device in which information can be input even in low-illuminance conditions can be provided.

A semiconductor device in which information can be input at a location distant from an input region can be provided.

BRIEF DESCRIPTION OF THE DRAWINGS

FIGS. 7A 7B1, 7B2, 7C, and 7D each illustrate one example of an electronic device.

DETAILED DESCRIPTION OF THE INVENTION

Figure 1:
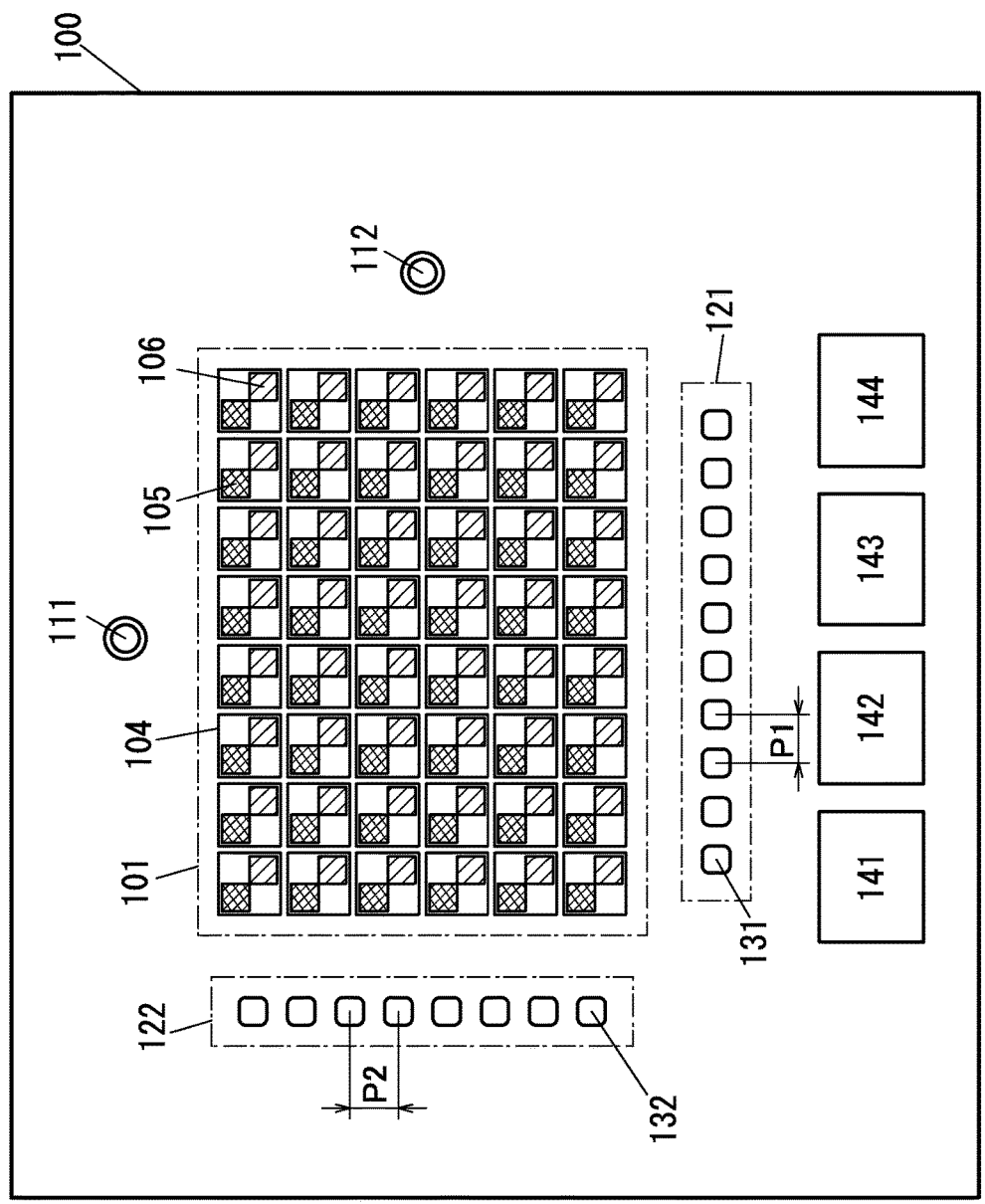
FIG. 1 illustrates a configuration example of a semiconductor device.

Embodiments will be described below in detail with reference to the accompanying drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below. Note that in the structures of the invention described below, the same portions or portions having similar functions are denoted by the same reference numerals in different drawings, and description of such portions is not repeated. Further, the same hatching pattern is applied to portions having similar functions, and the portions are not especially denoted by reference numerals in some cases.

Note that in each drawing referred to in this specification, the size of each component or the thickness of each layer might be exaggerated or a region might be omitted for clarity of the invention. Therefore, embodiments of the present invention are not limited to such a scale.

The position, size, range, and the like of each component illustrated in the drawings and the like are not accurately represented in some cases to facilitate understanding of the invention. Therefore, the disclosed invention is not necessarily limited to the position, the size, the range, or the like disclosed in the drawings and the like. For example, in the actual manufacturing process, a resist mask or the like might be unintentionally reduced in size by treatment such as etching, which is not illustrated in some cases for easy understanding.

Especially in a top view (also referred to as plan view), some components might not be illustrated for easy understanding.

Note that ordinal numbers such as "first" and "second" in this specification and the like are used in order to avoid confusion among components and do not denote the priority or the order such as the order of steps or the stacking order.

Further, functions of the source and the drain might be switched depending on operation conditions, e.g., when a transistor having a different polarity is employed or a direction of current flow is changed in circuit operation. Thus, the terms "source" and "drain" can be switched in this specification.

In this specification and the like, the expression "electrically connected" includes the case where components are connected through an "object having any electric function". There is no particular limitation on an "object having any electric function" as long as electric signals can be transmitted and received between components that are connected through the object. Accordingly, even when the expression "to be electrically connected" is used in this specification, there is a case in which no physical connection is made and a wiring is just extended in an actual circuit.

In this specification and the like, the term such as "electrode" or "wiring" does not limit a function of a component. For example, an "electrode" is used as part of a "wiring" in some cases, and vice versa. Further, the term "electrode" or "wiring" can also mean a combination of a plurality of "electrodes" and "wirings" formed in an integrated manner.

In this specification, a term "parallel" indicates that the angle formed between two straight lines is greater than or equal to −10° and less than or equal to 10°, and accordingly includes the case where the angle is greater than or equal to −5° and less than or equal to 5°. In addition, a term "perpendicular" or "vertical" indicates that the angle formed between two straight lines is greater than or equal to 80° and less than or equal to 100°, and accordingly includes the case where the angle is greater than or equal to 85° and less than or equal to 95°.

In this specification, a photosensor means a sensor element (including a photodiode and a transistor), and a photosensor portion means a region in which the sensor element is provided.

(Embodiment 1)

A semiconductor device of one embodiment of the present invention will be described with reference to FIG. 1.

<Configuration Example of Semiconductor Device>

A semiconductor device 100 illustrated in FIG. 1 includes a display portion 101, a first ultrasonic wave transmitter 111, a second ultrasonic wave transmitter 112, a first ultrasonic wave receiver 121, a second ultrasonic wave receiver 122, a display element control unit 141, a photosensor control unit 142, an ultrasonic wave sensor control unit 143, and an arithmetic unit 144.

The display portion 101 includes a plurality of pixels 104 arranged in matrix in a row direction and a column direction. In FIG. 1, each pixel 104 includes a display element 105 and a photosensor 106, for example. However, it is not necessary to provide the photosensors 106 in all of the pixels. A pitch at which the photosensors 106 are arranged may be determined so as to be suitable for the purpose of practitioners.

The first ultrasonic wave receiver 121 includes a plurality of ultrasonic wave sensors 131. The plurality of ultrasonic wave sensors 131 are arranged in a first direction (hereinafter, also referred to as "X-axis direction") at a pitch P1. The second ultrasonic wave receiver 122 includes the plurality of ultrasonic wave sensors 132. A plurality of ultrasonic wave sensors 132 are arranged in a second direction (hereinafter, also referred to as "Y-axis direction") which intersects with the first direction at right angles, at a pitch P2. The pitch P1 may be equal to or different from the pitch P2.

The display element control unit 141 is a circuit for controlling the display element 105. The display element control unit 141 includes a signal line driver circuit and a scan line driver circuit. The signal line driver circuit supplies a signal to each of the display elements 105 through a source signal line (e.g., a video signal line). The scan line driver circuit supplies a signal to each of the display elements 105 through a gate signal line (e.g., a scan line).

The scan line driver circuit has a function of selecting the display element 105 in the pixel 104 which is provided in a particular row. The signal line driver circuit has a function of supplying a predetermined potential of a video signal or the like to the display element 105 in the pixel 104 in the selected row. For example, a signal with which a transistor is turned on is supplied from the scan line driver circuit to the display element 105 through the gate signal line, a transistor in the display element 105 which is connected to the gate signal line is turned on, and consequently, the video signal supplied from the signal line driver circuit through the transistor is written to the display element 105.

The photosensor control unit 142 is a circuit for controlling the photosensor 106 and includes a photosensor driver circuit and a photosensor readout circuit.

The photosensor control unit 142 has a function of performing a reset operation, a holding operation, and a selecting operation on the photosensors 106 included in the pixels 104 placed in a certain row. Further, the photosensor readout circuit has a function of taking out output signals of the photosensors 106 included in the pixels 104 in the selected row. Note that the photosensor readout circuit can have a system in which an output of the photosensors is extracted as an analog signal to the outside by an OP amplifier; or a system in which the output is converted into a digital signal by an A/D converter circuit or the like and then extracted to the outside.

The ultrasonic wave sensor control unit 143 is a circuit for controlling the first ultrasonic wave transmitter 111 and the second ultrasonic wave transmitter 112 and includes an ultrasonic wave transmitter driver circuit and an ultrasonic wave sensor readout circuit.

The ultrasonic wave sensor control unit 143 has functions of making the first ultrasonic wave transmitter 111 emit ultrasonic waves with a first frequency and making the first ultrasonic wave receiver 121 receive the ultrasonic waves with the first frequency. The ultrasonic wave sensor control unit 143 has functions of making the second ultrasonic wave transmitter 112 emit ultrasonic waves with a second frequency and making the second ultrasonic wave receiver 122 receive the ultrasonic waves with the second frequency. Note that the ultrasonic wave sensor control unit 143 can include a structure in which outputs of the first ultrasonic wave receiver 121 and the second ultrasonic wave receiver 122 are extracted to the outside as an analog signal by an operational amplifier or converted into a digital signal by an A/D conversion circuit or the like to be extracted to the outside.

The arithmetic unit 144 has a function of performing arithmetic processing such as calculation of phase difference or logic operation by using an output signal of the photosensor control unit 142 and an output signal of the ultrasonic wave sensor control unit 143.

<Configuration Example of Pixel>

Figure 2:
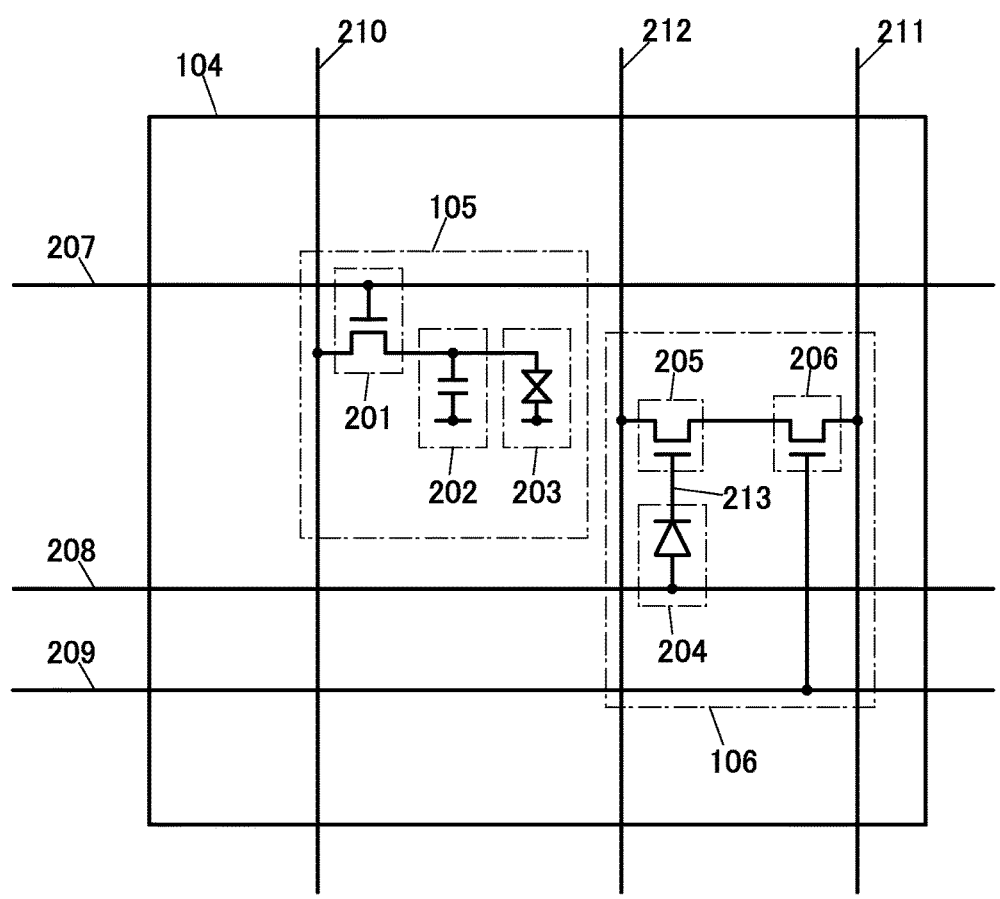
FIG. 2 illustrates a configuration example of a pixel circuit.

FIG. 2 illustrates an example of a circuit configuration of the pixel 104 which can be used for the semiconductor device 100. The pixel 104 illustrated in FIG. 2 includes the display element 105 and the photosensor 106. In this embodiment, a configuration example in which a liquid crystal display element is used as the display element 105 is described.

The display element 105 illustrated in FIG. 2 includes a transistor 201, a storage capacitor 202, and a liquid crystal element 203. The photosensor 106 includes a photodiode 204, a transistor 205, and a transistor 206.

A gate of the transistor 201 is electrically connected to a gate signal line 207, one of a source and a drain of the transistor 201 is electrically connected to a video data signal line 210, and the other of the source and the drain of the transistor 201 is electrically connected to one electrode of the storage capacitor 202 and one of electrodes of the liquid crystal element 203. The other electrode of the storage capacitor 202 and the other electrode of the liquid crystal element 203 are each held at a predetermined potential. The liquid crystal element 203 is an element including a pair of electrodes and a liquid crystal layer laid between the pair of electrodes.

When a potential at which the transistor 201 is turned on is applied to the gate signal line 207, the transistor 201 enables supply of the potential of the video data signal line 210 to the storage capacitor 202 and the one electrode of the liquid crystal element 203. The storage capacitor 202 holds the supplied potential even after the transistor 201 is turned off. The liquid crystal element 203 changes light transmittance in accordance with the potential supplied from the video data signal line 210.

Note that an off state of an n-channel transistor refers to a state where the gate voltage is sufficiently lower than the threshold voltage. Specifically, the transistor is in an off state when the gate voltage is lower than the threshold voltage by 1V or more, 2V or more, or 3V or more.

The photodiode 204 is formed with an amorphous semiconductor, a polycrystalline semiconductor, or a microcrystalline semiconductor. One electrode of the photodiode 204 is electrically connected to a photodiode reset signal line 208, and the other electrode of the photodiode 204 is electrically connected to a gate of the transistor 205 through a gate signal line 213. One of a source and a drain of the transistor 205 is electrically connected to a photosensor reference signal line 212, and the other of the source and the drain of the transistor 205 is electrically connected to one of a source and a drain of the transistor 206. A gate of the transistor 206 is electrically connected to a gate signal line 209, and the other of the source and the drain of the transistor 206 is electrically connected to a photosensor output signal line 211.

Note that the positions of the transistor 205 and the transistor 206 is not limited to those in the configuration in FIG. 2. It is acceptable to employ the following configuration: one of the source and the drain of the transistor 206 is electrically connected to the photosensor reference signal line 212, the other of the source and the drain of the transistor 206 is electrically connected to one of the source and the drain of the transistor 205, and the gate of the transistor 205 is electrically connected to the gate signal line 209, and the other of the source and the drain of the transistor 205 is electrically connected to the photosensor output signal line 211.

Figure 3:
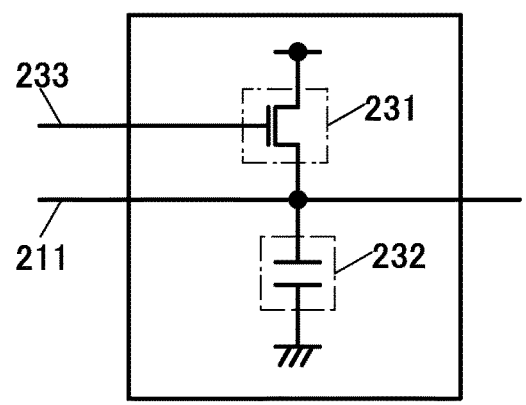
FIG. 3 illustrates a configuration example of a photosensor driver circuit.

Next, a configuration example of the photosensor driver circuit in the photosensor control unit 142 will be described with reference to FIG. 3. The photosensor driver circuit illustrated in FIG. 3 includes a transistor 231 and a storage capacitor 232. One of a source and a drain of the transistor 231 and one electrode of the storage capacitor 232 are electrically connected to the photosensor output signal line 211. The other of the source and the drain of the transistor 231 and the other electrode of the storage capacitor 232 are each held at a predetermined potential. A gate of the transistor 231 is electrically connected to a precharge signal line 233.

In the photosensor driver circuit, the potential of the photosensor output signal line 211 is set to a reference potential before the operation of the photosensor 106 in the pixel. The reference potential applied to the photosensor output signal line 211 may be any of a high power supply potential VDD, a low power supply potential VSS, a ground potential GND, and another predetermined potential. A potential at which the transistor 231 is turned on is applied to the precharge signal line 233, so that the potential of the photosensor output signal line 211 can be set to a reference potential. The storage capacitor 232 is not necessarily provided when the parasitic capacitance of the photosensor output signal line 211 is high.

<Example of Photosensor Readout Operation>

Figure 4:
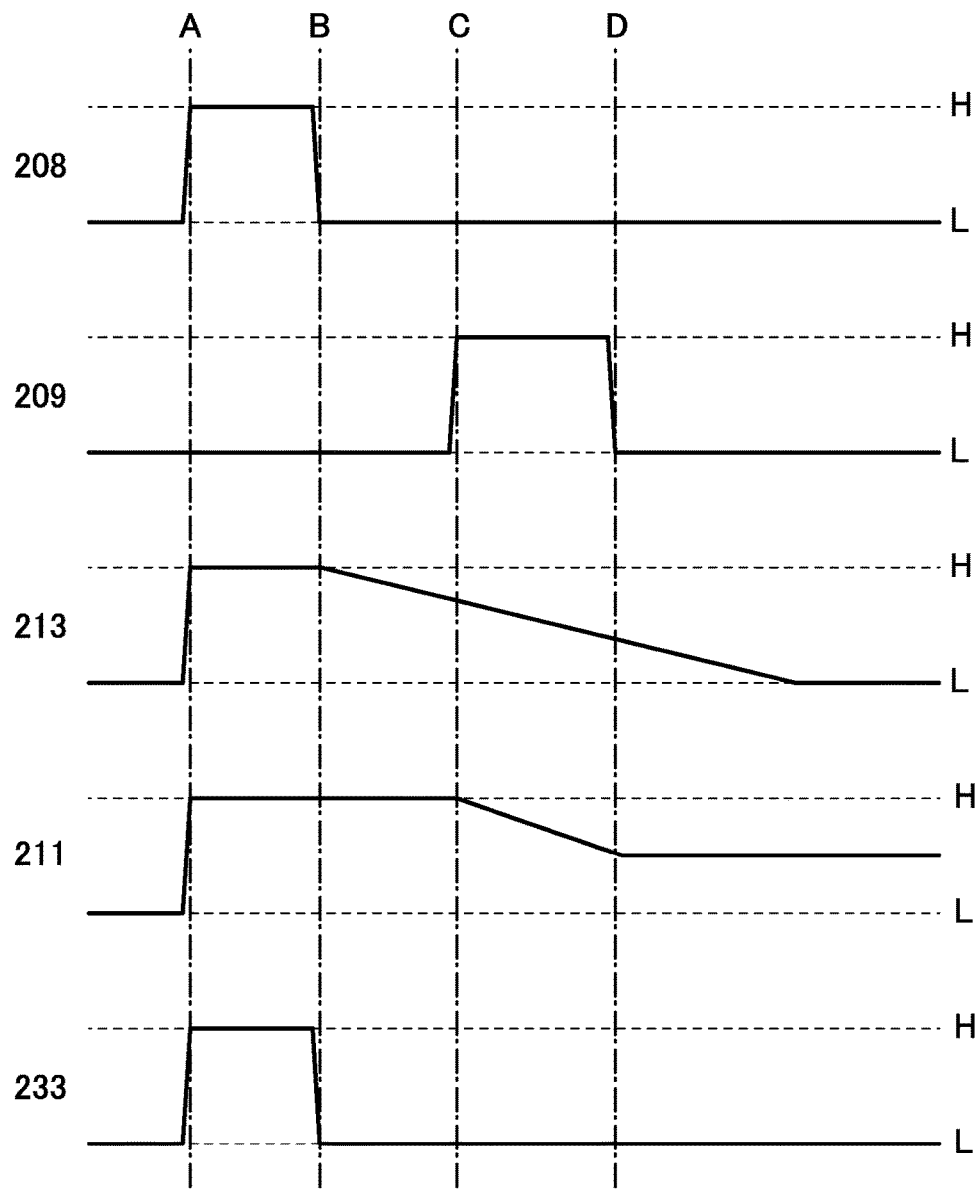
FIG. 4 is a timing diagram of one example of a readout operation.

Then, one example of readout operation of the photosensor 106 in the semiconductor device 100 will be described with reference to a timing diagram of FIG. 4. In FIG. 4, the horizontal axis represents time and the vertical axis represents the potentials of a photodiode reset signal line 208, the gate signal line 209, a gate signal line 213, the photosensor output signal line 211, and the precharge signal line 233.

In this embodiment, the transistors 201, 205, 206, and 231 are n-channel transistors. A potential at which an n-channel transistor is turned on is referred to as "a potential H". A potential at which an n-channel transistor is turned off is referred to as "a potential L".

At time A, the potential of the photodiode reset signal line 208 is set to a potential H (reset operation), and the potential of the gate signal line 213 connected to the gate of the transistor 205 through the photodiode 204 becomes a potential H. In addition, the potential of the precharge signal line 233 is set to a potential H, and a potential H is supplied to the photosensor output signal line 211 (precharge).

At time B, the potential of the photodiode reset signal line 208 is set to a potential L (accumulating operation), and the potential of the gate signal line 213 connected to the gate of the transistor 205 begins to be lowered because of the photocurrent of the photodiode 204. The photocurrent of the photodiode 204 increases when light is delivered; therefore, the lowering speed of the potential of the gate signal line 213 connected to the gate of the transistor 205 varies in accordance with the amount of the light delivered. The resistance value between the source and the drain of the transistor 205 changes in response to change in the potential of the gate signal line 213. At the time B, the potential of the precharge signal line 233 is set to a potential L to terminate precharging the photosensor output signal line 211. Consequently, the photosensor output signal line 211 is in an electrically floating state (floating state). Precharging the photosensor output signal line 211 needs to be terminated before time C.

At the time C, the potential of the gate signal line 209 is set to a potential H (selecting operation), so that the source and the drain of the transistor 206 are brought into conduction, and the photosensor reference signal line 212 and the photosensor output signal line 211 are brought into conduction through the transistor 205 and the transistor 206. Consequently, the potential of the photosensor output signal line 211 precharged to a potential H is lowered. Here, the rate at which the potential of the photosensor output signal line 211 is lowered depends on the resistance value between the source and the drain of the transistor 205. That is, the rate of decreasing the potential of the photosensor output signal line 211 varies in accordance with the amount of light which is delivered to the photodiode 204.

At a time D, the potential of the gate signal line 209 is set to a potential L, so that the transistor 206 is turned off, and the potential of the photosensor output signal line 211 is kept at a fixed value after the time D. Here, the constant value changes in accordance with the amount of light incident on the photodiode 204. Therefore, the amount of light incident on the photodiode 204 can be determined by obtaining the potential of the photosensor output signal line 211.

As described above, operation of individual photosensors 106 is realized by repeating reset operation, accumulating operation, and selecting operation. In order to realize high-speed imaging in the display device, it is necessary to perform the reset operation, the accumulating operation, and the selecting operation of all the pixels at high speed. If the off-state current of the transistor 206 in FIG. 2 is high, leakage current flows from the photosensor output signal line 211 to the photosensor reference signal line 212 through the transistor 205. That is, it is difficult to obtain change in the potential of the photosensor output signal line 211 (the signal 404) in accordance with the amount of light which is delivered to the photodiode 204.

Therefore, in particular, the transistor 206 is preferably a transistor which includes an oxide semiconductor in a semiconductor layer in which a channel is formed. The oxide semiconductor has a band gap of 2 eV or more; therefore, a transistor including an oxide semiconductor in a semiconductor layer has extremely low leakage current (also referred to as an extremely low off-state current) when the transistor is off. Specifically, in a transistor whose channel length is 3 µm and channel width is 10 µm, the off-state current can be lower than $1\times10^{-20}$ A, preferably lower than $1\times10^{-22}$ A, further preferably lower than $1\times10^{-24}$ A. That is, the on/off ratio of the transistor can be greater than or equal to 20 digits and less than or equal to 150 digits.

In addition, when a color filter is provided over the photosensors 106 included in the pixels, the illuminance around the display device can be detected through separation of light into color components of RGB. By detection of the illuminance around the display device through separation of light into RGB, the color temperature or chromaticity distribution around the display device can be detected more accurately, and the color tone of a display image can be precisely corrected.

In the semiconductor device 100, the photosensors 106 enable the display portion 101 function as a touch panel. Specifically, a difference in detected illuminance between a region which a user of the semiconductor device 100 has touched and the region which the user has not touched in the display portion 101 is calculated by the arithmetic unit 144, so that which part of the display portion 101 is touched by the user can be identified. Further, a user can input information without contact with the display portion 101, which prevents the display portion 101 from suffering breakage, scratches, attachment of stains, and the like due to a touch.

However, a method of using the photosensors 106 arranged in the display portion 101 has a problem of difficulty in identifying the location of an object to be detected depending on the operating environment of the semiconductor device 100. In particular, in the case where the semiconductor device 100 is used in low illuminance conditions (e.g., in a dark place), it is difficult to identify the location of the object.

In a semiconductor device with a display portion having photosensors, both of a display element and a photosensor which identifies the location of the object are provided in a pixel. Therefore, when the area of the photosensor is increased to improve sensitivity of detection, the area of the display element is decreased, resulting in degrading display quality.

<Identification of Location with Ultrasonic Wave Receiver>

An ultrasonic wave transmitter and an ultrasonic wave receiver allow the semiconductor device 100 to identify the location of the object with respect to the display portion 101, even in low-illuminance conditions. The ultrasonic wave transmitter and the ultrasonic wave receiver enable input of information to the semiconductor device 100 from a location distant from the display portion 101. One example of a way to detect the location of the object with the ultrasonic wave transmitter and the ultrasonic wave receiver will be described.

The ultrasonic wave sensor control unit 143 makes the first ultrasonic wave transmitter 111 transmit a first pulse ultrasonic wave which has the first frequency to a space ahead of the display portion 101.

When the object is in the space, the first ultrasonic wave receiver 121 detects a reflected wave of the first ultrasonic wave. The ultrasonic wave sensor control unit 143 identifies the ultrasonic wave sensor 131 which detects the strongest reflected wave among the plurality of ultrasonic wave sensors 131 in the first ultrasonic wave receiver 121. Then, the ultrasonic wave sensor control unit 143 detects response time from transmittance of the first ultrasonic wave to detection of the reflected wave by the ultrasonic wave sensor 131. In addition, the ultrasonic wave sensor control unit 143 detects a phase difference between the reflected wave detected by the ultrasonic wave sensor 131 and the reflected wave detected by the other ultrasonic wave sensors 131.

The arithmetic unit 144 calculates the location of the object in the X-axis direction and a distance between the object and the display portion 101, from the response time, the phase difference, and the pitch P1.

Similarly, the location of the object in the Y-axis direction and a distance between the object and the display portion 101 can be obtained with the second ultrasonic wave transmitter 112 and the second ultrasonic wave receiver 122. In this manner, the location of the object with respect to the display portion 101 can be identified.

Figure 5:
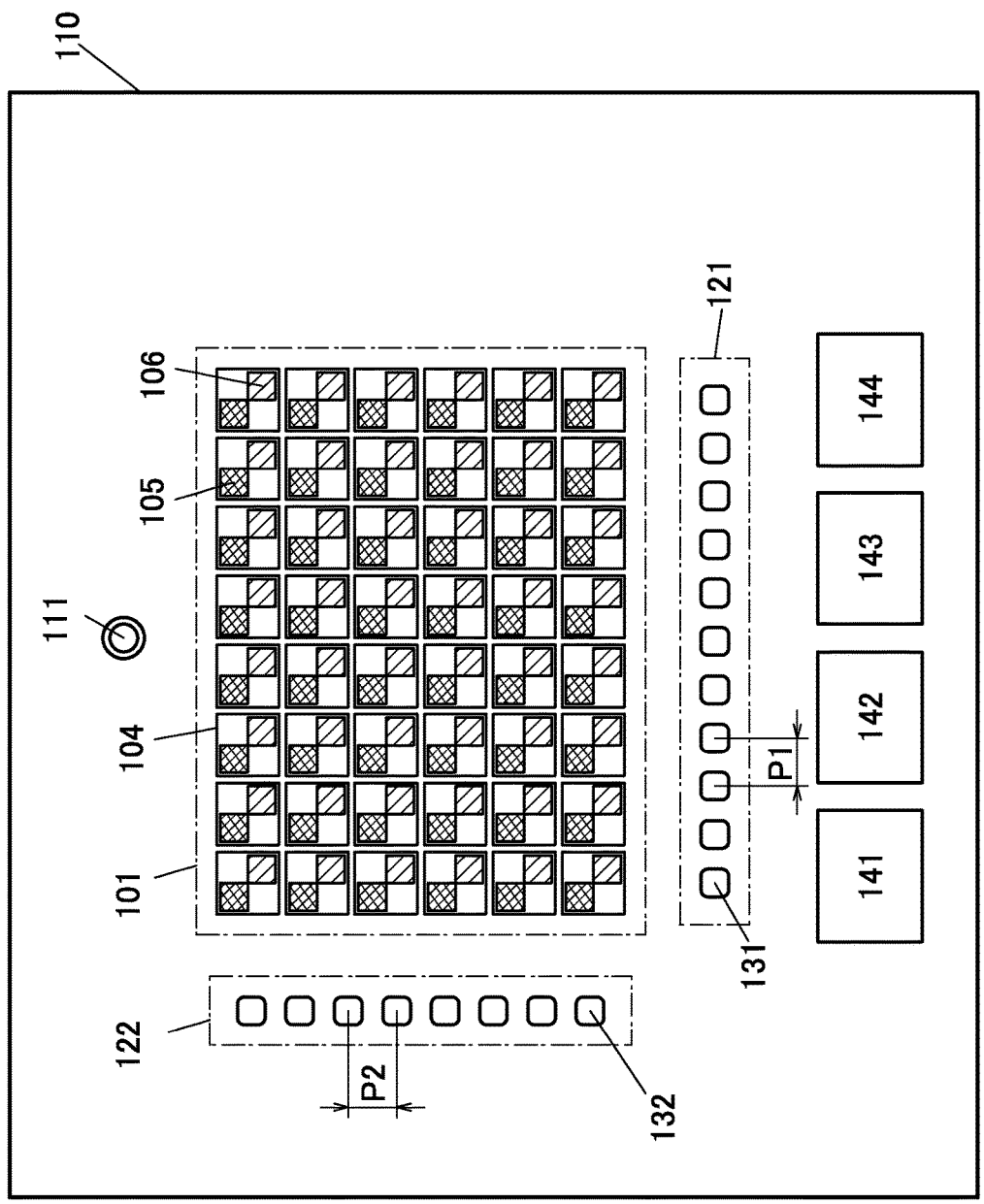
FIG. 5 illustrates a configuration example of a semiconductor device.

In the case where the first frequency and the second frequency are different, the locations of the object in the X-axis direction and the Y-axis direction can be promptly detected. As in a semiconductor device 110 illustrated in FIG. 5, it is possible to identify the locations of the object in the X-axis direction and the Y-axis direction only with the first ultrasonic wave transmitter 111 without the second ultrasonic wave transmitter 112. Note that in the case where the locations of the object in the X-axis direction and the Y-axis direction are identified with one ultrasonic wave transmitter, processing time of the arithmetic unit 144 may be long in comparison with the case where the location is detected with two ultrasonic wave transmitter. However, the number of members of the semiconductor device can be made to be smaller in such a case, which improves the productivity of the semiconductor device.

In the case of identifying only one of the locations of the object in the X-axis direction and the Y-axis direction in the semiconductor devices 100 and 110, a structure in which only one of the first ultrasonic wave receiver 121 and the second ultrasonic wave receiver 122 is provided can also be used.

The combination of photosensors, an ultrasonic wave transmitter, and an ultrasonic wave receiver makes it possible to accurately identify the location of an object even in low-illuminance conditions and to input information to the semiconductor devices 100 and 110. The combination of the photosensors, the ultrasonic wave transmitter, and the ultrasonic wave receiver makes it possible to input information to the semiconductor devices 100 and 110 at the locations distant from the semiconductor devices 100 and 110.

Further, information can be input without contact with the display portion 101, which prevents the display portion 101 from suffering breakage, scratches, attachment of stains, and the like due to a touch.

Since the sensitivity of detection can be increased without increase in the area of the photosensor in the pixel, a semiconductor device with high display quality can be obtained.

Contents displayed on the display portion 101 can be changed in response to information input to the semiconductor device 100 or 110. In addition, another semiconductor device connected to the semiconductor device 100 or 110 can be controlled with information input to the semiconductor device 100 or 110.

<Example of Selecting Operation of Photosensors or Ultrasonic Wave Sensor>

A method for determining whether photo sensors or an ultrasonic wave sensor is used, on the basis of the illuminance in an environment in which the semiconductor device 100 or 110 is used or the distance between the object and the semiconductor device 100 or 110 will be described with reference to flow charts in FIGS. 6A and 6B.

Figure 6A:
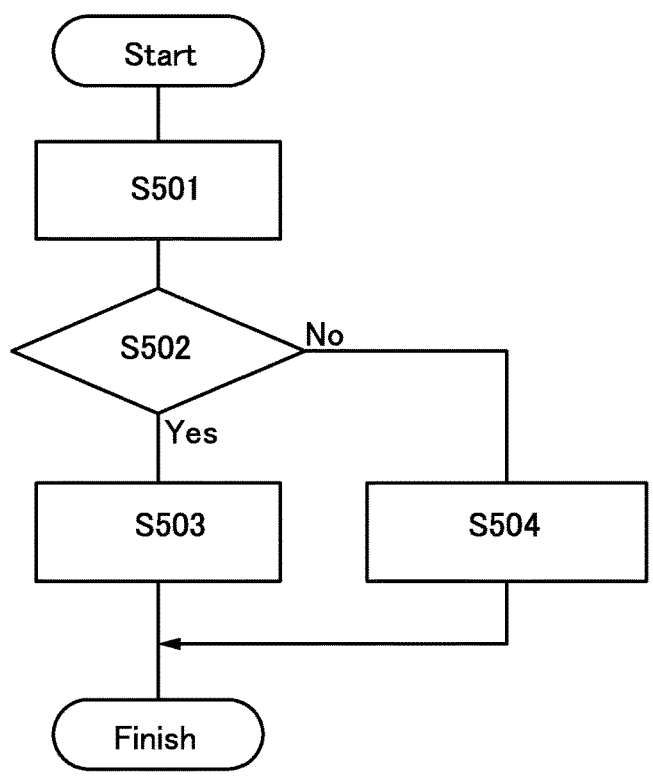
FIGS. 6A and 6B are flow charts showing operation examples of a semiconductor device.

FIG. 6A is a flow chart which shows an example of operation of switching sensors to be used depending on illuminance in an environment in which the semiconductor device 100 or 110 is used.

First, illuminance around the semiconductor device 100 or 110 is measured (Step S501). The illuminance can be measured with the photosensors 106 provided in the display portion 101. Note that the measurement of the illuminance may be performed with a sensor provided separately from the photosensors 106.

The measured illuminance is compared with a reference illuminance (Step S502). In the case where the measured illuminance is higher than or equal to the reference illuminance, which location of the display portion 101 corresponds to the location of the object is identified with the photosensors 106 (Step S503). In the case where the measured illuminance is lower than the reference illuminance, the ultrasonic wave sensor 131 and/or the ultrasonic wave sensor 132 are/is operated to identify a location in the display portion 101 which corresponds to the location of the object (Step S504). Note that a user can determine the reference illuminance.

Figure 6B:
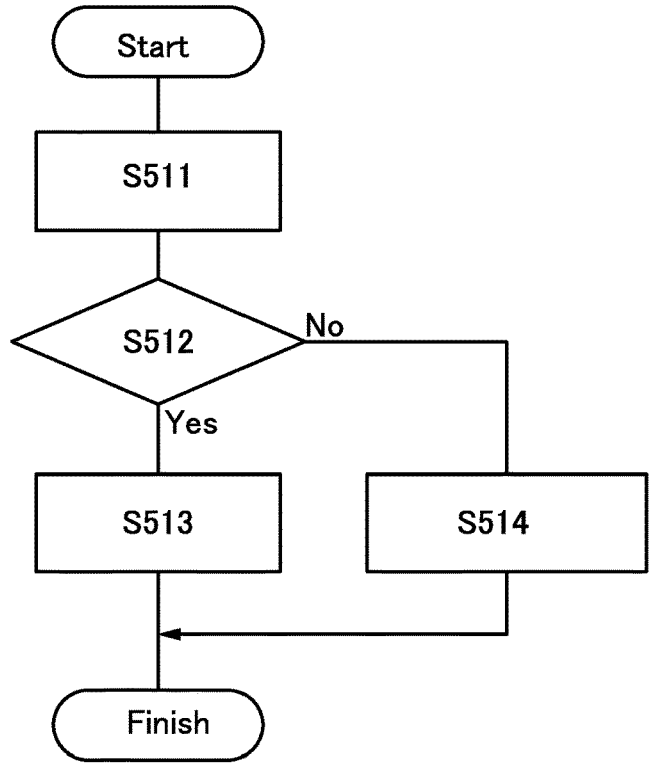

FIG. 6B is a flow chart which shows an example of operation of switching sensors to be used depending on a distance between the object and the semiconductor device 100 or 110.

First, the distance between the semiconductor device 100 or 110 and the object is measured (Step S511). Specifically, the distance between the display portion 101 and the object is measured. The distance can be measured with the ultrasonic wave transmitter 111 and the ultrasonic wave receiver 121 or with the ultrasonic wave transmitter 112 and the ultrasonic wave receiver 122.

The measured distance is compared with a reference distance (Step S512). In the case where the measured distance is shorter than the reference distance, which location of the display portion 101 corresponds to the location of the object is identified with the photosensors 106 (Step S513). In the case where the measured distance is longer than or equal to the reference distance, which location of the display portion 101 corresponds to the location of the object is identified by operating the ultrasonic wave sensor 131 and/or the ultrasonic wave sensor 132 (Step S514). Note that a user can determine the reference distance.

In this manner, by selecting the photosensor 106 or one or both of the ultrasonic wave sensor 131 and the ultrasonic wave sensor 132 for use, which location of the display portion 101 corresponds to the location of the object can be identified. It is also possible to use the combination of the photosensor 106 and the ultrasonic wave sensor 131 and/or the ultrasonic wave sensor 132. Note that the operation of the photosensor 106 is controlled by the photosensor control unit 142. The operations of the ultrasonic wave sensors 131 and 132 are controlled by the ultrasonic wave sensor control unit 143.

This embodiment can be implemented in appropriate combination with any of the structures described in the other embodiments.

(Embodiment 2)

Examples of an electronic device using the above-described semiconductor device are television sets (also referred to as televisions or television receivers), monitors of computers or the like, digital cameras, digital video cameras, digital photo frames, mobile phone sets (also referred to as mobile phones or mobile phone devices), portable game machines, portable information terminals, audio reproducing devices, and large-sized game machines such as pachinko machines. Specific examples of these electronic devices are given below.

Figure 7A:
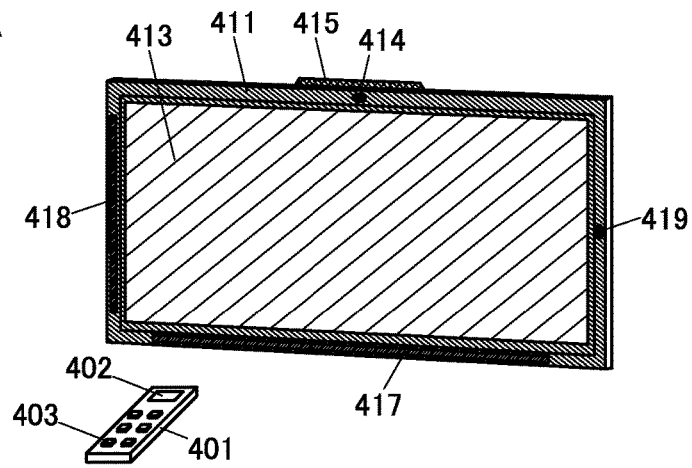
Figure 7A:
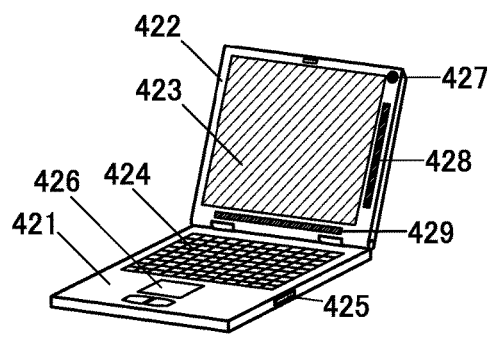
Figure 7A:
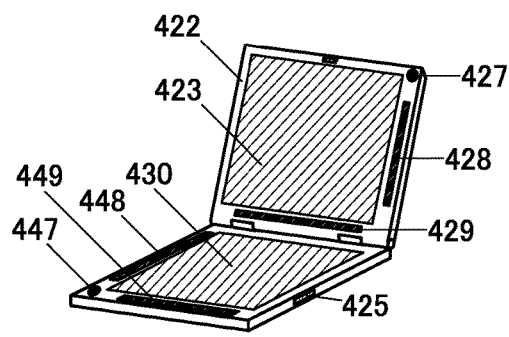

FIG. 7A illustrates an example of a television set. In the television set, a display portion 413 is incorporated in a housing 411. In addition, here, the housing 411 is supported to a wall by a fixing member 415. The display portion 413 is capable of displaying images. The display portion 413 includes the photosensor disclosed in Embodiment 1.

The television set illustrated in FIG. 7A includes a first ultrasonic wave transmitter 414, a second ultrasonic wave transmitter 419, a first ultrasonic wave receiver 417, and a second ultrasonic wave receiver 418.

The television set can be operated by operation switches incorporated in the housing 411 or a separate remote controller 401. Channels can be switched and volume can be controlled with operation keys 403 of the remote controller 401, whereby an image displayed on the display portion 413 can be controlled. Furthermore, the remote controller 401 may be provided with a display portion 402 for displaying data output from the remote controller 401.

The photosensor included in the display portion 413, the first ultrasonic wave transmitter 414, the second ultrasonic wave transmitter 419, the first ultrasonic wave receiver 417, and the second ultrasonic wave receiver 418 allow the television set to be controlled with gestures. Even in a dark room, the television set can be controlled with gestures without the remote controller 401.

FIG. 7B1 illustrates a computer including a main body 421, a housing 422, a display portion 423, a keyboard 424, an external connection port 425, a pointing device 426, and the like. Note that the computer includes the photosensor disclosed in Embodiment 1 in the display portion 423. The computer illustrated in FIG. 7B1 includes a first ultrasonic wave transmitter 427, a first ultrasonic wave receiver 428, and a second ultrasonic wave receiver 429.

Figure 7C:
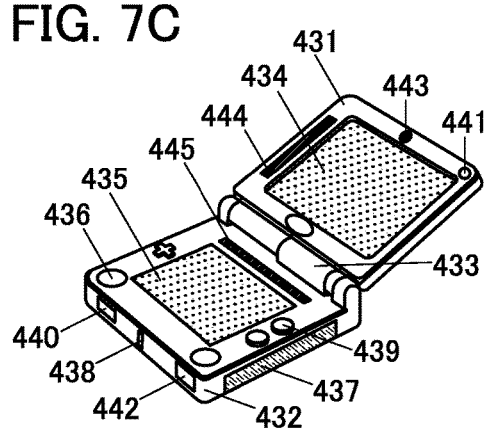

The computer illustrated in FIG. 7B1 may have a structure illustrated in FIG. 7B2. A computer illustrated in FIG. 7C is provided with a display portion 430 instead of the keyboard 424 and the pointing device 426.

The display portion 423 and the display portion 430 each include the photosensor disclosed in Embodiment 1. That is, the display portion 423 and the display portion 430 each have a touch panel, and input can be performed by operation of images, which are displayed on the display portion 423 and the display portion 430, with a finger or a pen. The display portion 423 and the display portion 430 can also display images other than the display for input.

The computer illustrated in FIG. 7B2 includes the first ultrasonic wave transmitter 427, the first ultrasonic wave receiver 428, the second ultrasonic wave receiver 429, a second ultrasonic wave transmitter 447, a third ultrasonic wave receiver 448, and a fourth ultrasonic wave receiver 449.

Note that one of the display portion 423 and the display portion 430 may be a touch panel. The computers illustrated in FIGS. 7B1 and 7B2 can be controlled without contact with the touch panel or the keyboard. This enables avoidance of troubles (e.g., breakage of the computer) and a longer product lifetime. Further, when the two screens are connected with a hinge as shown in FIG. 7B2, troubles can be prevented; for example, the screens can be prevented from being cracked or broken while the computer is being stored or carried.

FIG. 7C illustrates a portable amusement machine including two housings, a housing 431 and a housing 432. The housings 431 and 432 are connected with a connection portion 433 so as to be opened and closed. A display portion 434 is incorporated in the housing 431. A display portion 435 is incorporated in the housing 432. The display portion 434 and the display portion 435 each include the photosensor disclosed in Embodiment 1. A first ultrasonic wave transmitter 443 and a first ultrasonic wave receiver 444 are incorporated in the housing 431. A second ultrasonic wave receiver 445 is incorporated in the housing 432.

In addition, the portable game machine illustrated in FIG. 7C includes a speaker portion 436, a recording medium insertion portion 437, an LED lamp 438, an input means (an operation key 439, a connection terminal 440, a sensor 441 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), and a microphone 442), and the like. The portable game machine illustrated in FIG. 7C has a function of reading out a program or data stored in a storage medium to display it on the display portion, and a function of sharing information with another portable game machine by wireless communication. The portable game machine in FIG. 7D can have a variety of functions without limitation to the above functions.

The portable game machine illustrated in FIG. 7C can be controlled without contact with the main body. Accordingly, it is possible to reduce mechanical fatigue in the operation key 439 and the like and increase a product lifetime.

Figure 7D:
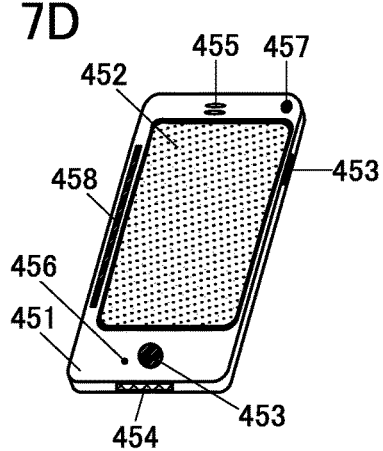

FIG. 7D illustrates an example of a cellular phone. The cellular phone includes an operation button 453, an external connection port 454, a speaker 455, a microphone 456, and the like in addition to a display portion 452 incorporated in a housing 451.

The cellular phone illustrated in FIG. 7D includes the photosensor disclosed in Embodiment 1 in the display portion 452. When the display portion 452 is touched with a finger or the like, data can be input into the cellular phone. In this case, operations such as making a call and creating an e-mail can be performed by touch on the display portion 452 with a finger or the like.

Further, in the cellular phone illustrated in FIG. 7D, a first ultrasonic wave transmitter 457 and a first ultrasonic wave receiver 458 are incorporated, and therefore, information can be input without contact with the display portion 452 even in low-illuminance conditions around the cellular phone.

There are mainly three screen modes of the display portion 452. The first mode is a display mode mainly for displaying an image. The second mode is an input mode mainly for inputting data such as characters. The third mode is a display-and-input mode in which two modes of the display mode and the input mode are combined.

For example, in the case of making a call or creating e-mail, a text input mode mainly for inputting text is selected for the display portion 452 so that text displayed on a screen can be inputted. In that case, it is preferable to display a keyboard or number buttons on almost all the area of the screen of the display portion 452. Further, with the first ultrasonic wave transmitter 457 and the first ultrasonic wave receiver 458, desired information can be selected from an address book displayed on the screen without contact with the display portion 452.

When a detection device including a sensor for detecting inclination, such as a gyroscope or an acceleration sensor, is provided inside the mobile phone, display on the screen of the display portion 452 can be automatically changed by determining the orientation of the mobile phone (whether the mobile phone is placed horizontally or vertically for a landscape mode or a portrait mode).

The screen modes can be changed by touch on the display portion 452 or operation with the operation button 453 of the housing 451. Alternatively, the screen modes can be changed with gestures or the like without contact with the display portion 452 and the operation button 453.

Alternatively, the screen modes can be switched depending on kinds of images displayed on the display portion 452. For example, when a signal of an image displayed on the display portion is a signal of moving image data, the screen mode is switched to the display mode. When the signal is a signal of text data, the screen mode is switched to the input mode.

Moreover, in the input mode, when input by touching the display portion 452 is not performed for a certain period while a signal detected by an photosensor in the display portion 452 is detected, the screen mode may be controlled so as to be switched from the input mode to the display mode.

The display portion 452 may function as an image sensor. For example, an image of a palm print, a fingerprint, or the like is taken when the display portion 452 is touched with the palm or the finger, whereby personal authentication can be performed. Further, by providing a backlight or a sensing light source which emits a near-infrared light in the display portion, an image of a finger vein, a palm vein, or the like can be taken.

This embodiment can be implemented in appropriate combination with any of the structures described in the other embodiments.

This application is based on Japanese Patent Application serial no. 2013-083466 filed with Japan Patent Office on Apr. 12, 2013, the entire contents of which are hereby incorporated by reference.

What is claimed is:

1. A semiconductor device comprising:
    a display portion comprising a plurality of pixels, each pixel comprising:
        a display element, the display element comprising:
            a first transistor;
            a first storage capacitor electrically connected to the first transistor;
            and
            a liquid crystal element electrically connected to the first transistor,
    a first ultrasonic wave transmitter configured to output a first ultrasonic wave;
    a second ultrasonic wave transmitter configured to output a second ultrasonic wave;
    a first ultrasonic wave receiver configured to detect the first ultrasonic wave reflected by an object;
    a second ultrasonic wave receiver configured to detect the second ultrasonic wave reflected by the object;
    an arithmetic unit configured to calculate a distance between the display portion and the object based on the first ultrasonic wave and the second ultrasonic wave detected by the first ultrasonic wave receiver and the second ultrasonic wave receiver,
    wherein the first ultrasonic wave receiver includes a first plurality of ultrasonic wave sensors arranged in a first direction,
    wherein the second ultrasonic wave receiver includes a second plurality of ultrasonic wave sensors arranged in a second direction different from the first direction,
    wherein a location of the object is identified with a photosensor or the first plurality of ultrasonic wave sensors and the second plurality of ultrasonic wave sensors,
    wherein the location of the object is solely identified with the photosensor where an illuminance is higher than or equal to a reference illuminance, and
    wherein the location of the object is solely identified with the first plurality of ultrasonic wave sensors and the second plurality of ultrasonic wave sensors where the illuminance is lower than the reference illuminance.

2. The semiconductor device according to claim 1, wherein the plurality of pixels are arranged in matrix.

3. The semiconductor device according to claim 1, wherein the first direction intersects with the second direction at right angles.

4. The semiconductor device according to claim 1, further comprising:
    a photosensor control portion; and
    an ultrasonic sensor control portion.

5. An electronic equipment comprising the semiconductor device according to claim 1.

6. A method for driving a semiconductor device, the semiconductor device comprising:
    a display portion comprising a pixel, the pixel comprising:
        a display element, the display element comprising:
            a first transistor;
            a first storage capacitor electrically connected to the first transistor; and
            a liquid crystal element electrically connected to the first transistor,
        a photosensor,
    an ultrasonic wave sensor, and
    the method comprising steps of:
        measuring illuminance around the semiconductor device with the photosensor; and
        identifying a location of an object with the photosensor or the ultrasonic wave sensor,
    wherein the location of the object is only identified with the photosensor where the illuminance is higher than or equal to a reference illuminance, and
    wherein the location of the object is only identified with the ultrasonic wave sensor where the illuminance is lower than the reference illuminance.

7. A method for driving a semiconductor device, the semiconductor device comprising:
    a display portion comprising a pixel, the pixel comprising:
        a display element;
        a photosensor;
    an ultrasonic wave sensor, and
    the method comprising steps of:
        measuring a distance from the display portion to an object with the ultrasonic wave sensor; and
        identifying a location of the object with the photosensor or the ultrasonic wave sensor,
    wherein the location of the object is solely identified with the photosensor where the distance is shorter than a reference distance, and
    wherein the location of the object is solely identified with the ultrasonic wave sensor where the distance is longer than or equal to the reference distance.

* * * * *